United States Patent
Kubota (10) Patent No.: US 10,753,481 B2
(45) Date of Patent: Aug. 25, 2020

(54) REGULATING VALVE, VALVE BODY, AND VALVE STEM

(71) Applicant: Azbil Corporation, Chiyoda-ku (JP)

(72) Inventor: Kou Kubota, Chiyoda-ku (JP)

(73) Assignee: Azbil Corporation, Chiyoda-ku (JP)

(*) Notice: Subject to any disclaimer, the term of this patent is extended or adjusted under 35 U.S.C. 154(b) by 152 days.

(21) Appl. No.: 15/686,518

(22) Filed: Aug. 25, 2017

(65) Prior Publication Data
US 2018/0058589 A1 Mar. 1, 2018

(30) Foreign Application Priority Data

Aug. 26, 2016 (JP) ................................. 2016-165554

(51) Int. Cl.
*F16K 1/48* (2006.01)
*F16K 1/50* (2006.01)

(52) U.S. Cl.
CPC ................ *F16K 1/485* (2013.01); *F16K 1/48* (2013.01); *F16K 1/50* (2013.01)

(58) Field of Classification Search
CPC . F16K 1/485; F16K 1/482; F16K 1/48; F16K 1/487; F16K 1/50; F16K 27/02; F16K 31/1262; F16K 31/126; F16K 3/246; F16B 7/04; F16B 7/0406; F16B 7/0426; F16B 7/06; F16B 7/18; F16B 7/182;
(Continued)

(56) References Cited

U.S. PATENT DOCUMENTS 218,523 A * 8/1879 Grinnell .................. E21B 17/05
403/165
716,626 A * 12/1902 Cowper .................. F16K 1/482
251/86
(Continued)

FOREIGN PATENT DOCUMENTS

CN 101779070 A 7/2010
CN 202274125 U 6/2012
(Continued)

OTHER PUBLICATIONS

"Pins available in all sizes and grades" by Fastener Corporation of America (publicly available since Aug. 7, 2009, http://www.fastenercorp.com/pins.htm). (Year: 2009).*
(Continued)

*Primary Examiner* — Reinaldo Sanchez-Medina
*Assistant Examiner* — David Colon-Morales
(74) *Attorney, Agent, or Firm* — Oblon, McClelland, Maier & Neustadt, L.L.P.

(57) ABSTRACT

A regulating valve includes a valve body having a cylindrical portion, a valve stem inserted into the cylindrical portion and coupled to the valve body, and a locking member, in which the valve body includes a female screw including threads formed on an inner wall of the cylindrical portion and a plurality of first holes penetrating through an inner wall and an outer wall of a region of the cylindrical portion, the region having no threads of the female screw, in which the valve stem includes a male screw having threads formed on a surface close to the other end of the valve stem and at least one second hole formed in a region of the surface close to the other end of the valve stem, the region having no threads of the male screw.

7 Claims, 12 Drawing Sheets

(58) Field of Classification Search
CPC ........ F16B 7/187; F16B 17/004; F16B 21/12; F16B 2021/14; F16B 21/16; F16B 35/005; F16B 35/04; Y10T 403/29; Y10T 403/295; Y10T 403/32598; Y10T 403/556; Y10T 403/56; Y10T 403/5741
USPC ......................................... 251/61.2, 61, 61.5
See application file for complete search history.

(56) References Cited

U.S. PATENT DOCUMENTS

| | | | | |
|---|---|---|---|---|
| 1,693,032 | A * | 11/1928 | Henry | F16K 1/482 251/86 |
| 3,101,210 | A * | 8/1963 | Johnson | F16K 1/48 285/333 |
| 3,204,655 | A * | 9/1965 | Bredtschneider | F16K 1/482 137/315.27 |
| 3,262,673 | A * | 7/1966 | Seeley | F16K 1/482 251/357 |
| 3,290,739 | A * | 12/1966 | Harley | B22D 41/16 222/597 |
| 3,305,208 | A * | 2/1967 | Bredtschneider | F16K 1/482 251/176 |
| 3,439,947 | A * | 4/1969 | Luckenbill | F16B 7/00 285/4 |
| 4,169,487 | A * | 10/1979 | Watson | F16K 1/482 137/243.4 |
| 4,721,284 | A * | 1/1988 | Bankard | F16K 1/54 251/122 |
| 4,791,952 | A * | 12/1988 | Laurel | E03B 9/04 137/15.02 |
| 5,020,934 | A * | 6/1991 | Floren | E03B 9/02 403/2 |
| 6,991,218 | B2 * | 1/2006 | Lovell | F16K 1/48 251/357 |
| 7,387,292 | B1 * | 6/2008 | Fleming | F16B 39/023 251/356 |
| 7,401,760 | B2 * | 7/2008 | Kanzaka | F16K 51/02 251/63 |
| 7,721,753 | B2 * | 5/2010 | Wears | F16K 1/48 137/315.27 |
| 9,033,308 | B2 * | 5/2015 | Kiesbauer | F16K 1/48 251/291 |
| 9,316,321 | B2 * | 4/2016 | McCarty | F16K 1/48 |
| 9,429,244 | B2 * | 8/2016 | Gao | F16K 1/38 |
| 9,441,757 | B2 * | 9/2016 | McCarty | F16K 31/44 |
| 9,599,250 | B2 * | 3/2017 | Gossett | F16K 31/126 |
| 9,995,400 | B2 * | 6/2018 | Richardson | F16K 1/36 |
| 10,197,183 | B2 * | 2/2019 | Alman | F16K 1/36 |
| 2002/0017327 | A1 * | 2/2002 | Kawaai | F16J 9/08 137/625.3 |
| 2008/0149875 | A1 * | 6/2008 | Hoffmann | F16K 1/523 251/285 |
| 2009/0146096 | A1 * | 6/2009 | Davies, Jr. | F16K 1/48 251/333 |
| 2012/0286183 | A1 | 11/2012 | McCarty | |
| 2016/0223088 | A1 * | 8/2016 | Richardson | F16K 1/36 |
| 2018/0058590 | A1 * | 3/2018 | Kubota | F16K 1/48 |

FOREIGN PATENT DOCUMENTS

| | | |
|---|---|---|
| CN | 104676026 | * 11/2013 |
| CN | 103591320 A | 2/2014 |
| CN | 203847741 U | 9/2014 |
| CN | 104676026 A | 6/2015 |
| CN | 105041827 A | 11/2015 |
| CN | 105889267 A | 8/2016 |
| DE | 203 15 222 U1 | 1/2004 |
| JP | 56-65218 U | 6/1981 |
| JP | 60-146966 | 8/1985 |
| JP | 2005-106263 A | 4/2005 |
| KR | 10-2007-0045714 A | 5/2007 |

OTHER PUBLICATIONS

Combined Chinese Office Action and Search Report dated Jan. 14, 2019 in Chinese Patent Application No. 201710734677.1 (with English translation of Category of Cited Documents), 9 pages.
Office Action dated Jul. 23, 2019, in corresponding Chinese Patent Application No. 201710734677.1, 10 pages.
Notice of Reasons for Refusal dated Jan. 29, 2020, in Japanese Patent Application No. 2016-165554 (with English-language translation), 9 pages.

* cited by examiner

Figure 13 ural gas is damaged

REGULATING VALVE, VALVE BODY, AND VALVE STEM

CROSS-REFERENCE TO RELATED APPLICATIONS

The present application claims the benefit of and priority to Japanese Patent Application No. 2016-165554, filed on Aug. 26, 2016, the entire contents of which are incorporated herein by reference.

FIELD

The present disclosure relates to a regulating valve, a valve body, and a valve stem and, more particularly, to a coupling structure between a valve stem and a valve body in a regulating valve.

BACKGROUND

Generally, in a regulating valve, a valve stem is coupled to a valve body (plug) by engaging the valve stem with the valve body via screwing (see JP-A-60-146966). However, if the engagement is performed only by screwing, vibrations of the valve body caused when the regulating valve performs flow rate control of fluid may loosen the screwing. Accordingly, a pin is used as one means for preventing (locking) the screwing from being loosened in a conventional regulating valve.

Figure 12:
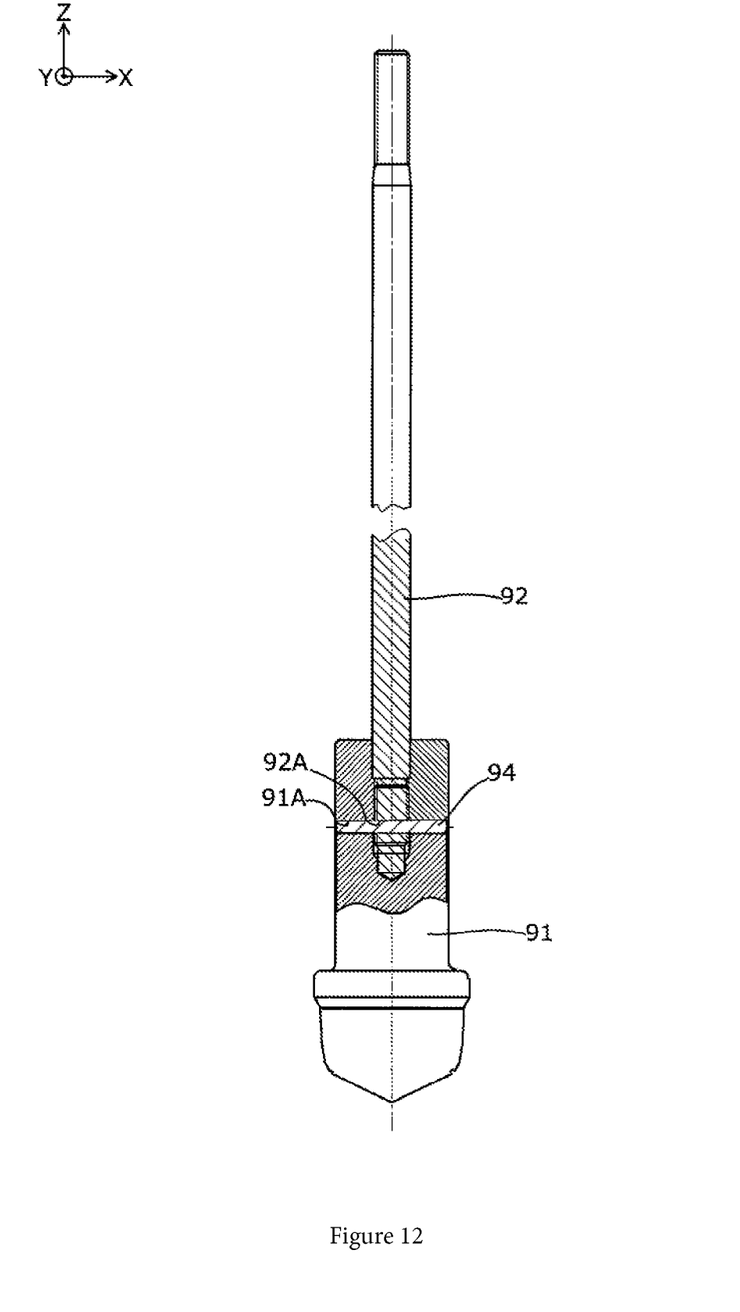
FIG. 12 illustrates an example of the coupling structure, between a valve stem and a valve body in a conventional regulating valve.
Figure 13:
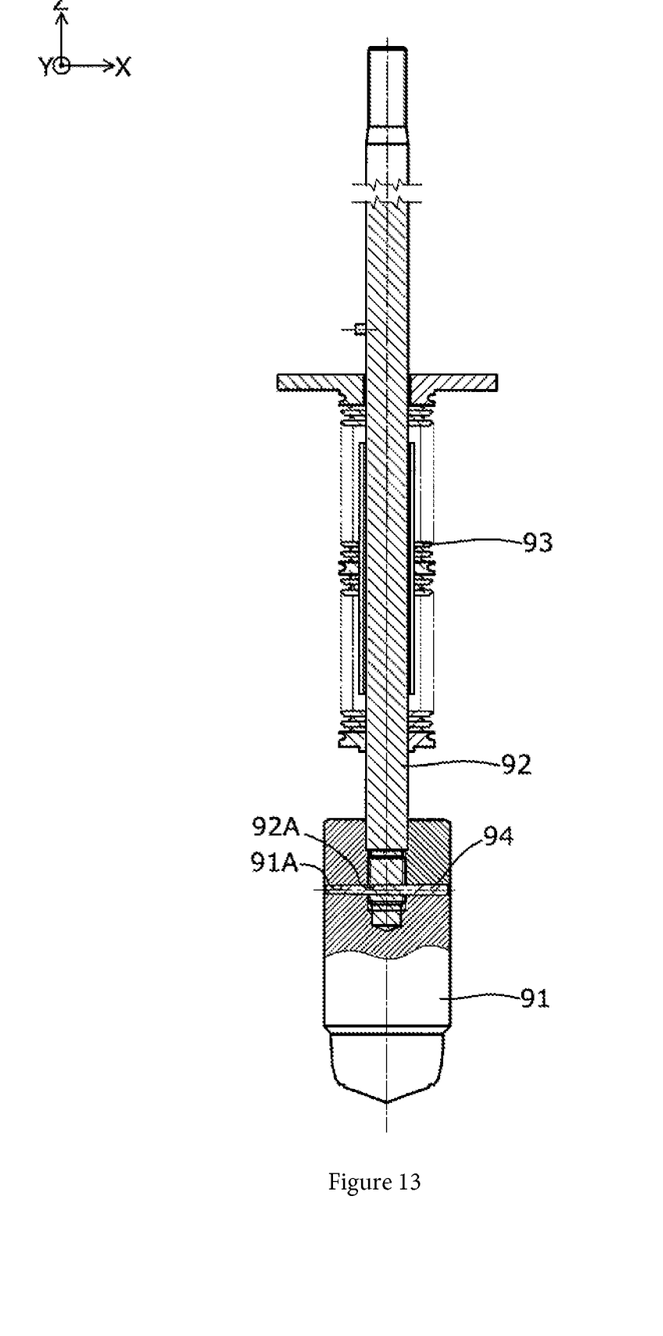
FIG. 13 illustrates an example of the coupling structure between a valve stem and a valve body in a conventional regulating valve in which a bellows has been welded to the valve stem.

FIGS. 12 and 13 illustrate examples of the coupling structure between a valve stem and a valve body in conventional regulating valves. FIG. 12 illustrates the coupling structure of a valve stem and a valve body of a conventional typical globe valve and FIG. 13 illustrates, the coupling structure of a valve stem and a valve body of a globe valve in which a bellows has been welded to a conventional valve stem.

As illustrated in FIGS. 12 and 13, in conventional regulating valves, after a valve body 91 is engaged with a valve stem 92 by screwing, through-holes 91A and 92A are formed in the valve body 91 and the valve stem 92 in the screwed region, respectively, and a pin 94 (for example, a taper pin or a spring pin) is inserted into the through-holes 91A and 92A to prevent the screwing from being loosened between the valve body 91 and the valve stem 92.

SUMMARY

However, the conventional method in which a pin is inserted into a through-hole formed in the engagement portion by screwing between the valve stem and the valve body has the following problems.

For example, the case in which the valve body 91 illustrated in FIG. 12 needs to be replaced because it has been damaged is considered. In this case, it is economical to replace only the valve body 91 and continuously use the intact valve stem 92. When only the valve body 31 is replaced, it is necessary to prepare a new valve body 91 and form a through-hole 91A in this valve body 91. However, it is not easy to bore a new through-hole 91A because the new through-hole 91A needs to be aligned with a through-hole 92A, which has been formed, of the valve stem 92 when the valve body 91 is engaged with the valve stem 92 by screwing. Even if such boring is enabled, since components of a regulating valve need to be replaced generally in a site such as a plant in which the regulating valve is installed, it is not practical to bore a through-hole as described above in the site such as a plant in which the regulating valve is installed.

For this reason, conventionally, even when either the valve stem or the valve body is damaged, a new set of a valve stem and a valve body is manufactured in the manufacturing factory or the like, a through-hole is bored in the valve stem and the valve body in the state in which the valve stem is engaged with the valve body by screwing, and the processed valve stem and valve body are transported to the installation site for replacement.

In the method in which a valve stem and a valve body are replaced as one set, the effects in terms of cost is small when the components to be replaced are inexpensive. However, when the valve body 31 is damaged in the regulating valve having the valve stem 92 to which a bellows 93 has been welded as illustrated in, for example, FIG. 13, since the valve stem 92, which is expensive, to which the bellows 93 has been welded needs to be replaced in addition to the valve body 91, the cost of replacing the components becomes high.

In addition, in the coupling structure in which a pin is inserted into through-holes formed in the engagement portion by screwing between the valve stem and the valve body as in conventional regulating valves, since the through-hole is formed in part of threads, the entire engagement force is reduced by the amount equivalent to the area of the through-hole.

The present disclosure addresses the above problems with an object of providing a regulating valve that facilitates the replacement of components while keeping the engagement force by screwing between the valve stem and the valve body.

A regulating valve (1) according to the disclosure includes a valve body (11) having one end at which a plug head (110) is provided and the other end at which a cylindrical portion (111) is provided, the plug head (110) controlling a flow rate of a fluid in a valve box; a valve stem (12) having one end connected to a setting/operating device (14) and the other end inserted, into the cylindrical portion and coupled to the valve body; and a locking member (15) for preventing coupling between the valve body and the valve stem from being loosened, in which the valve body includes a female screw (112) including threads formed on an inner wall of the cylindrical port ion and a plurality of first holes (114) penetrating through an inner wall and an outer wall of a region (113) of the cylindrical portion, the region having no threads of the female screw, the valve stem includes a male screw (120) having threads formed on a surface close to the other end of the valve stem and at least one second hole (122) formed in a region (121) of the surface close to the other end of the valve stem, the region having no threads of the male screw, the valve body is coupled to the valve stem when the female screw is engaged with the male screw, and the locking member is inserted into the at least one second hole (122) of the valve stem through any one of the first holes (114) of the valve body.

In the regulating valve described above, the first holes include grooves formed in an end portion of the cylindrical portion so as to extend in an axial line direction and a depth (D1) of the grooves may be larger than a width (W) in a circumferential direction of the grooves.

In the regulating valve described above, the at least one second hole is formed so as to penetrate through the valve stem, the plurality of grooves may be disposed point-symmetrically with respect to the center of the cylindrical portion in plan view, and the locking member may be inserted into a set of the grooves disposed point-symmetrically and the at least one second hole.

In the regulating valve described above, the at least one second hole may include a plurality of second holes.

In the regulating valve described above, the other end of the valve stem is formed in a cylindrical shape, two second holes (122_1 and 122_2) of the plurality of second holes may be disposed so as to deviate from each other in an axial line direction of the valve stem, the two second holes being adjacent to each other in a circumferential direction of the valve stem.

In the regulating valve described above, the locking member may be a knurled pin.

It should be noted that reference numerals in the drawings corresponding to components of the invention are enclosed in parentheses in the above description.

For the reasons described above, according to the disclosure, it is possible to provide a regulating valve that facilitates the replacement of components while keeping the engagement force by screwing between the valve stem and the valve body.

DETAILED DESCRIPTION

An embodiment of the disclosure will be described below with reference to the drawings. It should be noted that components common to the individual embodiments are given the same reference numerals to omit the repeated descriptions.

Figure 1:
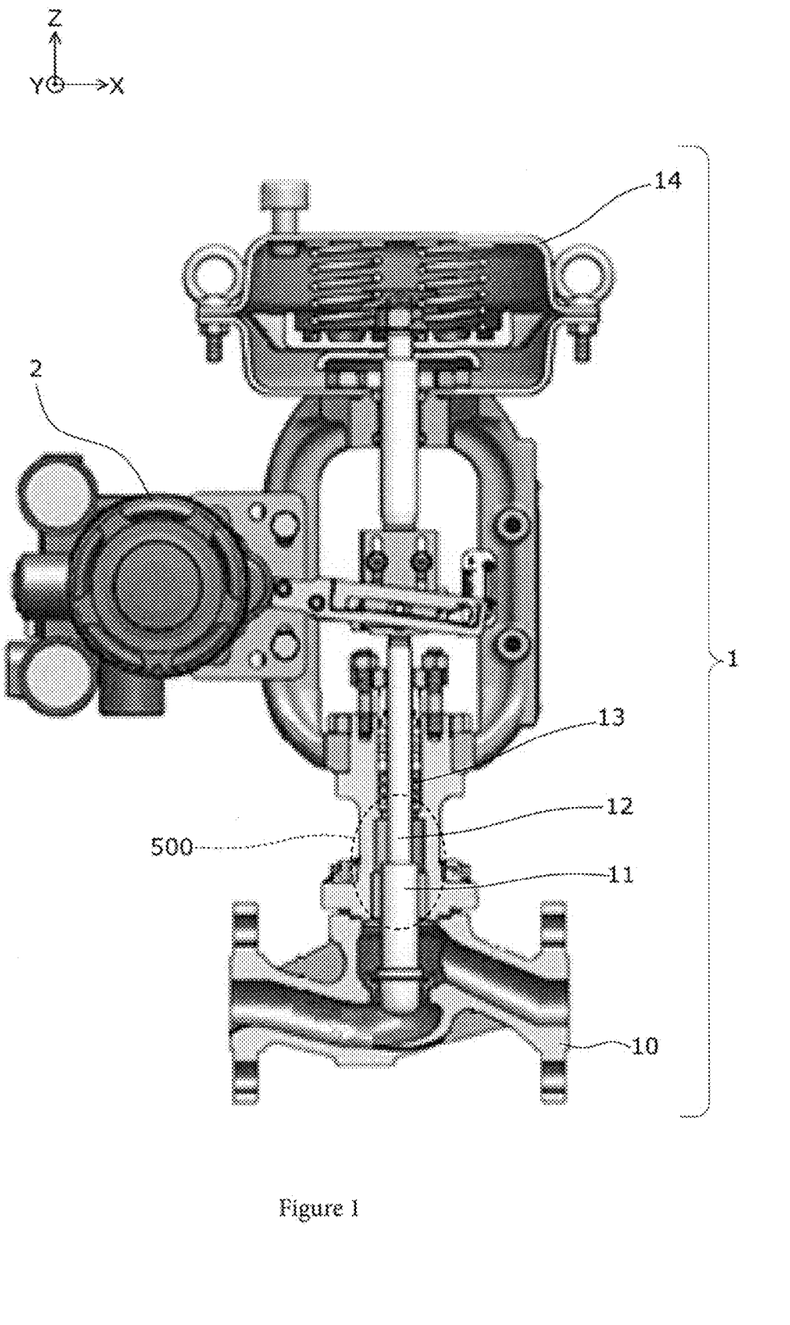
FIG. 1 schematically illustrates a regulating valve according to an embodiment of the disclosure.

FIG. 1 schematically illustrates the regulating valve according to one embodiment.

The regulating valve 1 illustrated in FIG. 1 includes, in a valve box 10, the valve body 11, a valve stem 12 for driving the valve body 11, a gland portion 13 having various types of packings and a guide ring for preventing the leakage of a control target fluid and holding a valve stem 12 slidably, and a setting/operating device 14 for operating the valve stem 12. The setting/operating device 14, which is, for example, an air type valve actuator, slides the valve stem 12 of the regulating valve 1 in the up-down direction (Y direction) in accordance with an output air pressure signal supplied from a positioner 2 attached to the regulating valve 1, to thereby control the opening and closing operation of the valve body 11. The fluid introduced into the regulating valve 1 may be a liquid or gas, and is not particularly limited.

The regulating, valve 1 according to the embodiment is characterized by the coupling structure between the valve body 11 and the valve stem 12. The coupling structure between the valve body 11 and the valve stem 12 will be described in detail below. Although the case in which the regulating valve 1 has the valve body 11 of a contoured shape is assumed in the following description, the type of the valve body 11 is not particularly limited.

Figure 2:
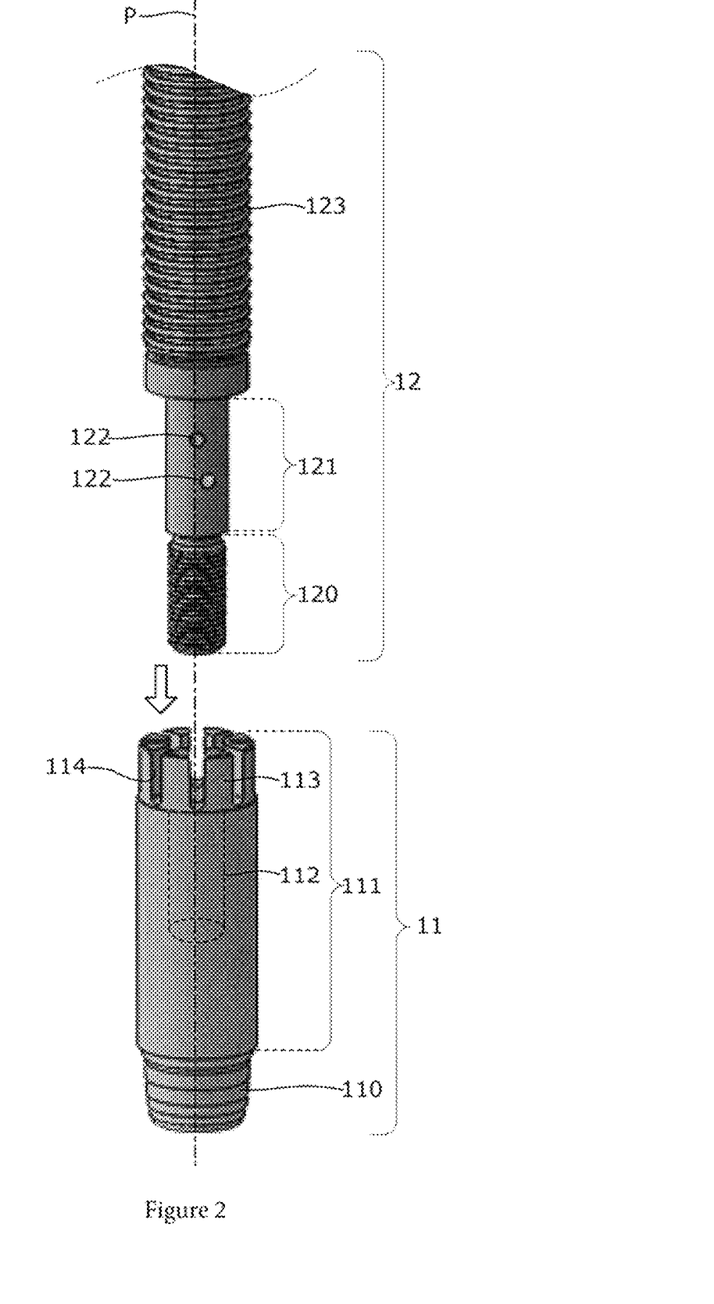
FIG. 2 is a perspective view schematically illustrating the valve body and the valve stem not engaged with each other.

FIG. 2 is a perspective view schematically illustrating the valve body 11 and the valve stem 12 not engaged with each other.

Figure 3:
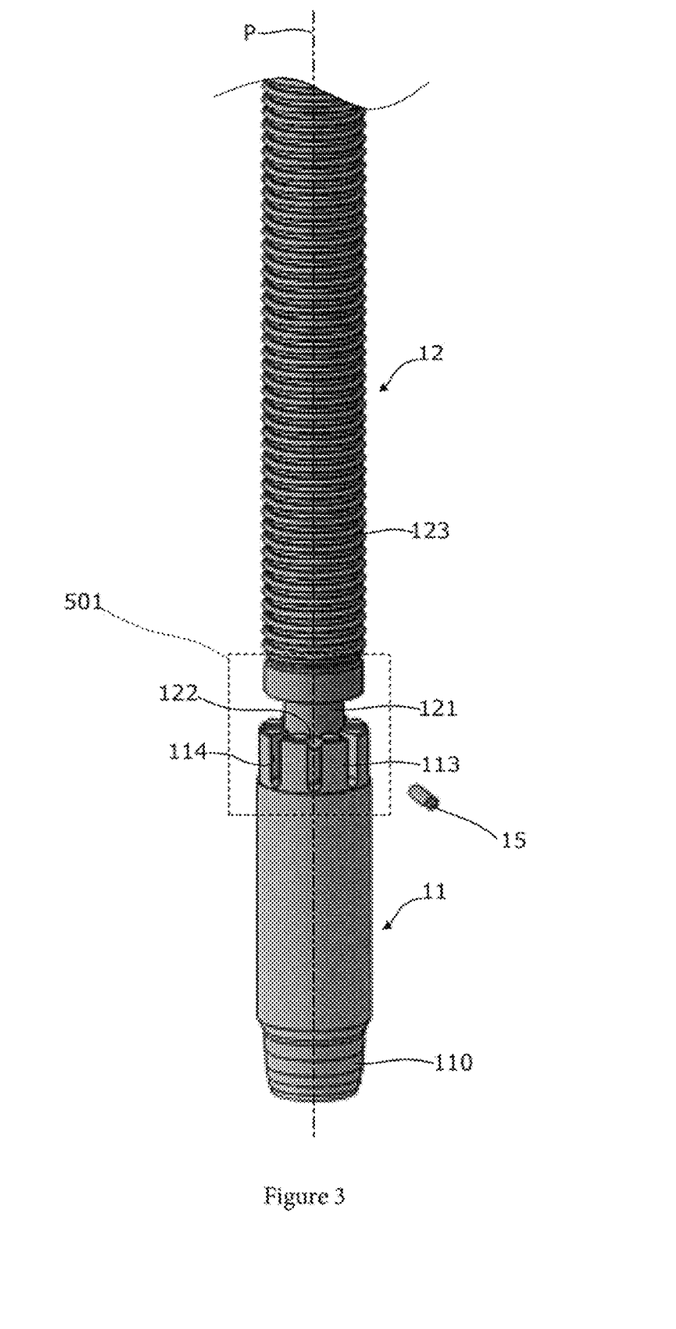
FIG. 3 is a perspective view schematically illustrating the valve body and the valve stem having been engaged with each other.
Figure 4:
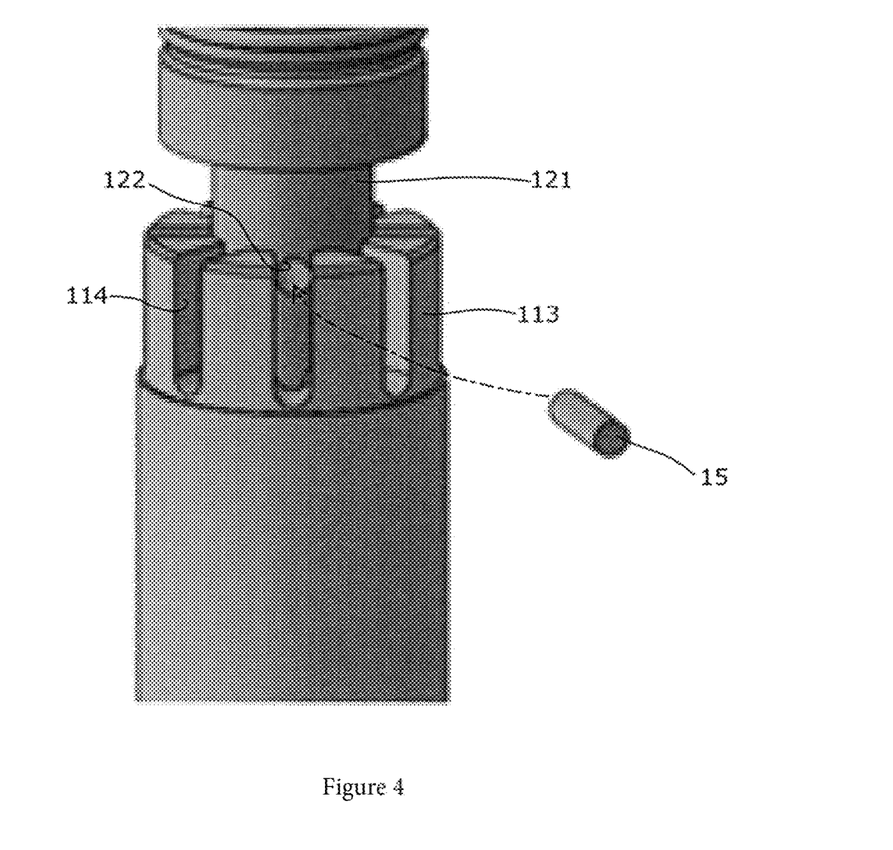
FIG. 4 is an enlarged view illustrating the coupling portion between the valve body and the valve stem in FIG. 3.

FIGS. 3 and 4 are perspective views schematically illustrating the valve body 11 and the valve stem 12 engaged with each other.

FIGS. 2 and 3 are enlarged views of the region of the regulating valve 1 surrounded by a dotted line 500 illustrated in FIG. 1 and FIG. 4 is an enlarged view of the region surrounded by a dotted line 501 in FIG. 3. The axial line of the valve body 11 and the valve stem 12 is represented by reference numeral P.

As illustrated in FIGS. 2 to 4, the regulating valve 1 has the structure in which the valve stem 12 is inserted into a cylindrical portion 111 of the valve body 11, a female screw 112 formed on the inner wall of the cylindrical portion 111 is engaged with a male screw 120 formed on a surface of the valve stem 12, and a locking member 15 is inserted into a hole 122 formed in a region 121 of the valve stem 12 in which the male screw 120 is not formed through grooves 114 formed in a region 113 of the valve body 11 in which the female screw 112 is not formed to prevent the engagement between the valve body 11 and the valve stem 12 from being loosened.

First, the structure of the valve body 11 will be described.

Figure 5:
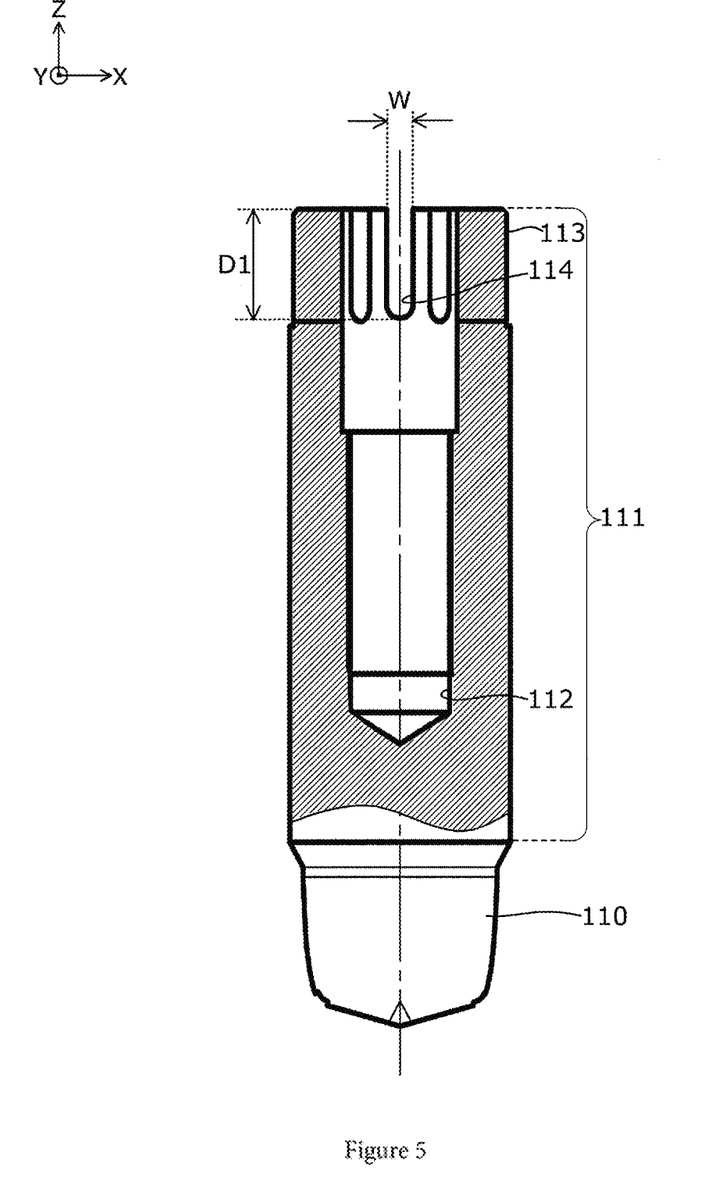
FIG. 5 schematically illustrates the cross section of a cylindrical portion 111 of a valve body 11 seen from a direction orthogonal to an axial line P.

FIG. 5 schematically illustrates the cross section of the cylindrical portion 111 of the valve body 11 seen from the direction orthogonal to the axial line P.

Figure 6:
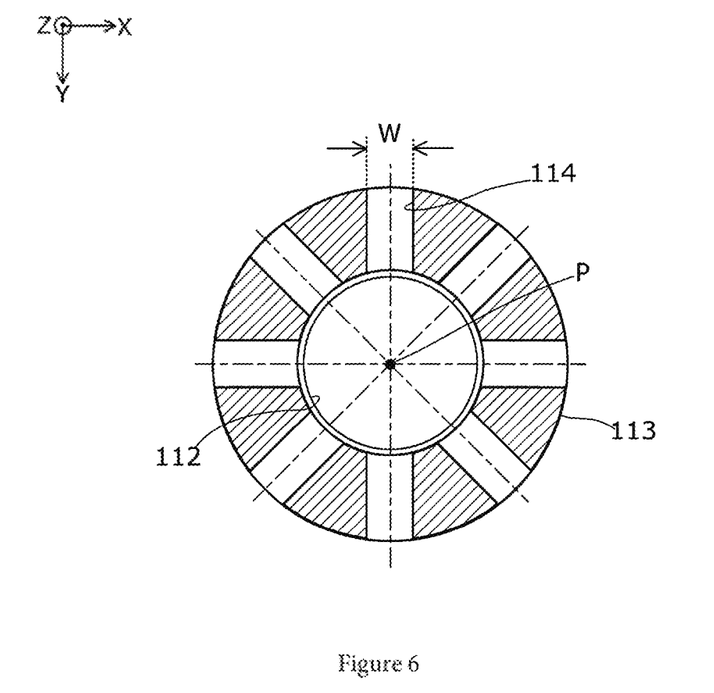
FIG. 6 is schematically illustrates the cylindrical portion of the valve body in plan view seen from the direction of the axial line P.

FIG. 6 is schematically illustrates the cylindrical portion 111 of the valve body 11 in plan view seen from the direction of the axial line P.

As illustrated in FIGS. 5 and 6, the valve body 11 has a plug head 110 for controlling the flow rate of a fluid in the valve box 10 at one end thereof and has the cylindrical portion 111 at the other end thereof. The cylindrical portion 111 is made of metal such as, for example, stainless steel SUS316.

The cylindrical portion 111 includes the female screw 112 including threads formed on the inner wall thereof and a plurality of holes 114 penetrating through the inner wall and the outer wall of the region (referred to below as the non-threaded region 113) of the cylindrical portion 111 in which no threads of the female screw 112 are formed.

When the valve body 11 has, for example, a contoured shape, the cylindrical portion 111 is equivalent to a tubular (for example, cylindrical) guide port ion for guiding the sliding of the plug head 110 in the valve box 10.

The plurality of holes 114 includes a plurality of grooves formed in the end portion of the cylindrical portion 111 (guide portion) in the direction (Z direction) of the axial line P. The holes 114 are referred to below as the grooves 114. In addition, as illustrated in FIG. 6, the plurality of grooves 114 is disposed point-symmetrically with respect to the center (axial line P) of the cylindrical portion 111 in plan view.

Next, the structure of the valve stem 12 will foe described.

Figure 7:
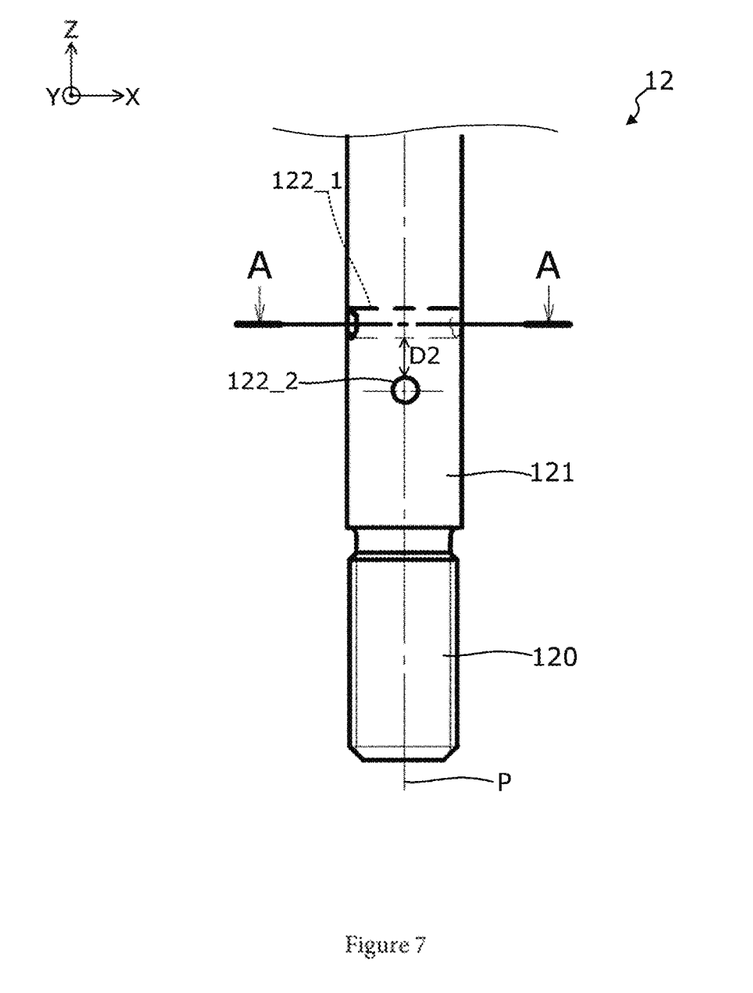
FIG. 7 schematically illustrates the valve stem in plan view seen from the direction orthogonal to the axial line P.

FIG. 7 schematically illustrates the valve, stem 12 in plan view seen from the direction orthogonal to the axial line P.

Figure 8:
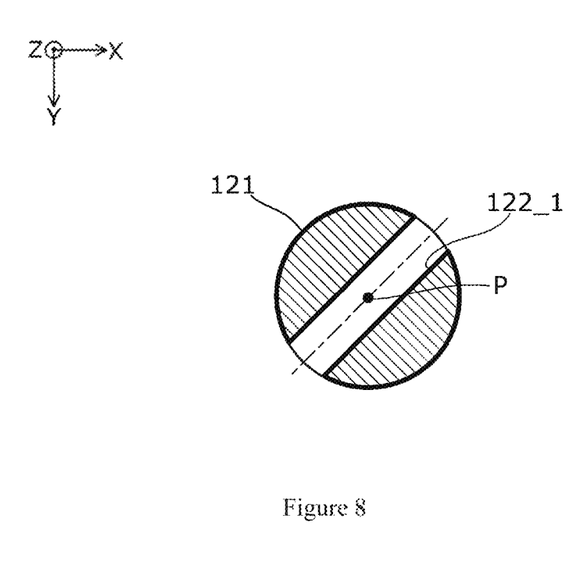
FIG. 8 schematically illustrates a cross section, of the valve stem taken along a line A-A.

FIG. 8 schematically illustrates the cross section of the valve stem 12 taken along the line A-A.

The valve stem 12 is made of metal such as, for example, stainless steel SUS316.

As illustrated in FIGS. 2 and 7, the valve stem 12 includes the male screw 120 having threads formed on the surface at the other end of the valve stem 12 and at least one hole 122 formed in the region (referred to below as the "non-threaded region 121") on the surface at the other end of the valve stem 12 in which no threads of the male screw 120 are formed.

As illustrated in FIG. 8, the at least one hole 122 is a through-hole penetrating through the valve stem 12 in the direction orthogonal to the axial line P. The at least one hole 122 preferably includes a plurality of holes 122.

When the plurality of holes 122 is formed, the two holes 122 adjacent to each other in the circumferential direction of the valve stem 12 are preferably disposed so as to deviate from each other in the direction of the axial line P. For example, as illustrated in FIG. 7, when one of the holes 122 close to the setting/operating device 14 is assumed to be a hole 122_1 and the other of the holes 122 close to the male screw 120 is assumed to be a hole 122_2, the hole 122_1 and the hole 122_2 are preferably formed so as to deviate from each other in the direction of the axial line P of the valve stem 12.

A distance D2 in the direction of the axial line P between the hole 122_1 and the hole 122_2 only needs to be large enough to ignore effects of two holes 122_1 and 122_2 bored on the strength requested for the valve stem 12.

Next, the method for coupling the valve body 11 and the valve stem 12 will be described.

First, the range of adequate torques between the male screw 120 of the valve stem 12 and the female screw 112 of the valve body 11 is measured in advance. Next, as illustrated in FIG. 3, the worker inserts one end at which the male screw 120 of the valve stem 12 is formed into the cylindrical portion 111 in which the female screw 112 of the valve body 11 is formed and screws the male screw 120 with the female screw 112 while measuring the torque. At this time, it is necessary to find the position at which the measured value of the torque falls within the above range of adequate torques and any one of the holes 122 close to the valve stem 12 is aligned with one of the plurality of grooves 114 close to the valve body 11 in the direction orthogonal to the axial line P. As illustrated in FIG. 4, the screwing of the male screw 120 is stopped at the position at which they are aligned with each other and the locking member 15 is inserted into a set of the grooves 114 and the hole 122 aligned with each other.

Figure 9:
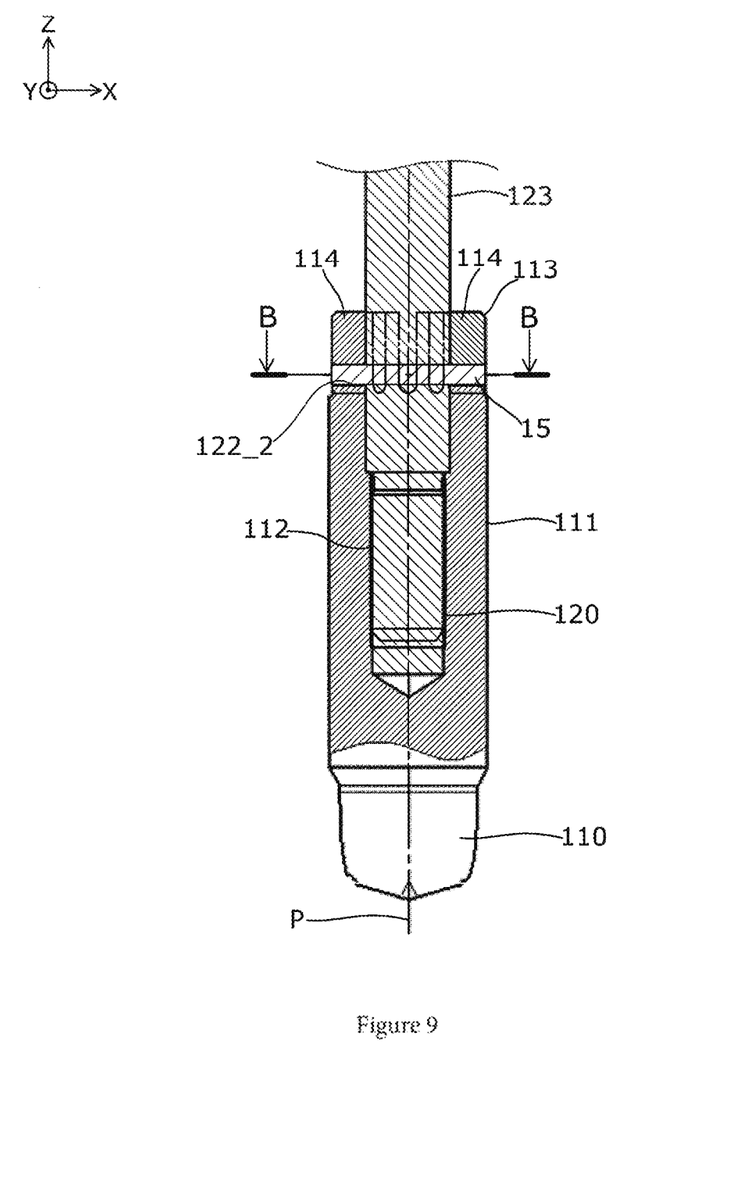
FIG. 9 schematically illustrates a cross section of a coupling portion between the valve body and the valve stem in the state in which the locking member is inserted into the coupling portion.
Figure 10:
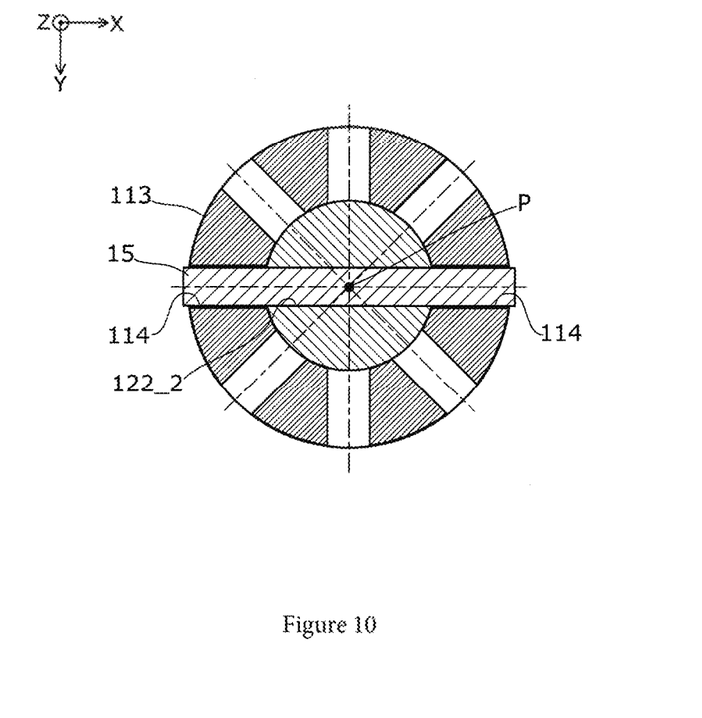
FIG. 10 schematically illustrates a cross section of the coupling portion taken along a line B-B in FIG. 9.

FIGS. 9 and 10 illustrate the shape of a coupling portion between the valve body 11 and the valve stem 12 in the state in which the locking member 15 is inserted into the coupling portion. FIG. 9 schematically illustrates a cross section in the direction of the axial line P of the above coupling portion and FIG. 10 schematically illustrates a cross section of the above coupling portion taken along line B-B.

As illustrated in FIGS. 9 and 10, for example, when the hole 122_2 is aligned with a set of grooves 114 in the state in which the male screw 120 is engaged with the female screw 112 within the range of adequate torques, the locking member 15 is inserted from one of the grooves 114 aligned with the hole 122_2 into the other of the grooves 114 via the hole 122_1. This can prevent engagement between the valve stem 12 and the valve body 11 from being loosened while maintaining the adequate engagement.

A width W (length in the circumferential direction of the grooves 114) of the grooves 114 only needs to large enough to receive the locking member 15. For example, the grooves 114 may be formed so as to be loose-fitted onto the locking members 15. In addition, a diameter r of the holes 122_1 and 122_2 only needs to be large enough to receive the locking member 15. For example, the holes 122_1 and 122_2 may be formed so as to be loose-fitted onto the locking members 15.

In addition, the depth (length in the Z axis direction) D1 of the grooves 114 is larger than the width W.

Figure 11:
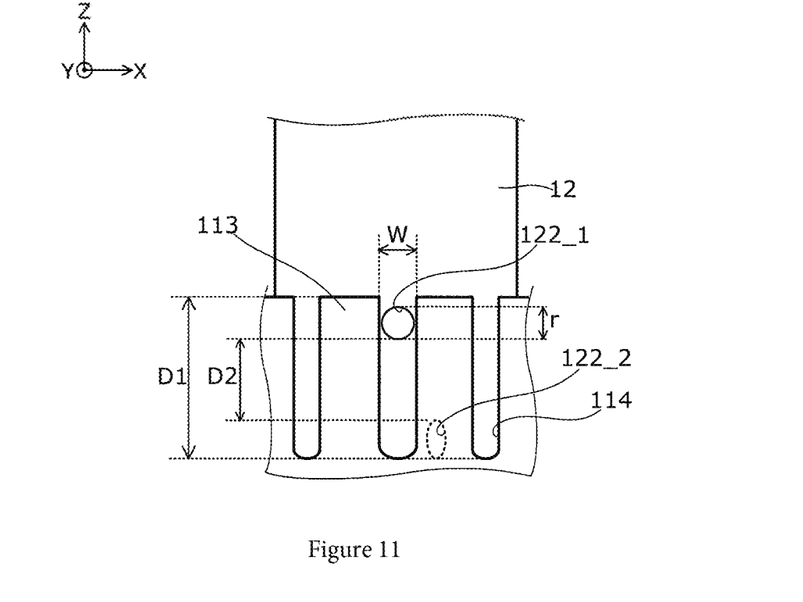
FIG. 11 illustrates the relationship between the position of the groove of the valve body and the position of the hole of the valve stem.

Particularly when the plurality of holes 122 is formed in the valve stem 12, in the state in which the valve body 11 is engaged with the valve stem 12 within the range of adequate torques, the depth D1 is determined so that the plurality of the holes 122 arranged in the direction of the axial line P as seen from the Y direction is aligned with the opening parts of the grooves 114. Specifically, as illustrated in FIG. 11, when n (n is an integer equal to or more than 2) holes 122 are formed, the depth D1 is determined so that the n holes 122 are aligned with at least one groove 114 when screwed within the range of adequate torques. That is, the depth D1 of the grooves 114 only needs to meet the following expression; $D1 \geq n*r+(n-1)*D2$.

The locking member 15 is preferably, for example, a knurled pin having bumps and dips on the surface of the shaft of the locking member 15 so as not to be disconnected easily after being inserted.

In addition, the locking member 15 is preferably made of a metal having the same thermal expansion coefficient (for example, the linear expansion coefficient) as in the cylindrical portion 111 of the valve body 11 and the valve stem 12. For example, the locking member 15 is made of stainless steel SUS316 as in the cylindrical portion 111 of the valve body 11 and the valve stem 12. Since this makes the linear expansion coefficients of the locking member 15, the valve stem 12, and the valve body 11 identical to each other, it is possible to suppress reduction in the locking performance of the locking member 15 caused by changes in the temperature of the regulating valve 1.

As described above, since the regulating valve 1 according to the embodiment has the structure in which the female screw 112 formed on the valve body 11 is engaged with the male screw 120 formed on the valve stem 12 and the engagement between the female screw 112 and the male screw 120 is prevented from being loosened by inserting the pin into the holes 122 of the valve stem 12 in which the male screw 120 is not formed via any one of the plurality of grooves 114 formed in the region 113 of the valve body 11 in which the female screw 112 is not formed, even when any one of the valve body 11 and the valve stem 12 is damaged and needs to be replaced, only the damaged component needs to be replaced and the intact component can be used continuously, thereby suppressing the cost for replacing the component.

For example, when the valve body 11 is damaged, preferably, a new valve body 11 having the same structure (that is, the structure in which a plurality of grooves 114 is formed in the region 113 in which the female screw 112 is not formed) as the damaged valve body 11 is prepared, the holes 122 are aligned with the grooves 114 while the existing valve stem 12 is screwed into the valve body 11 so as to fall within the range of adequate torques, and then the locking member 15 is inserted.

Since this eliminates the need to machine the grooves 114 in the new valve body 11 so that the grooves 114 are aligned with the existing holes 122 formed in the intact valve stem 12 in a site such as a plant in which the regulating valve is installed or to replace components including the intact valve stem 12, components can be replaced easily and the cost for replacing components can be suppressed as compared with conventional regulating valves.

In addition, since the holes 122 and grooves 114 into which the locking member 15 is inserted are formed in the regions 113 and 121 of the valve stem 12 and the valve body 11 in which screws are not formed, engagement force by screwing is not reduced as compared with the case in which through-holes are provided in the engagement portion of the valve stem and the valve body by screwing as in conventional regulating valves.

Accordingly, in the regulating valve 1 according to the embodiment, it is possible to achieve a regulating valve in which components can be easily replaced while keeping the engagement force by screwing between the valve stem and the valve body.

In addition, by forming the grooves 114 having a depth D1 larger than the width W in the circumferential direction as the hole close to the valve body 11, the probability that the hole 122 close to the valve stem 12 is aligned with the groove 114 can be increased when the valve body 11 is engaged with the valve stem 12 by screwing within the range of adequate torques.

In addition, by forming the plurality of holes 122 in the valve stem 12, the probability that the holes 122 are aligned with the grooves 114 can be further increased when the valve stem 12 is engaged with the valve body 11 by screwing within the range of adequate torques. In addition, for example, when the valve body 11 is replaced, even if the hole 122 of the valve stem 12 into which the locking member 15 has been inserted is damaged and unavailable, the locking member 15 can be inserted into another hole 122.

In addition, when the plurality of holes 122 is formed, since the distance between the holes 122 can be increased by disposing the two holes 122 adjacent to each other in the circumferential direction of the valve stem 12 so as to deviate from each other in the direction of the axial line P of the valve stem 12, reduction in the strength of the valve stem 12 can be prevented.

In addition, since the holes 122 are through-holes, the plurality of grooves 114 is formed point-symmetrically, and the locking member 15 is inserted from one of the grooves 114 into the other of the grooves 114 formed on the opposite side with respect to the axial line P via the hole 122 of the valve stem 12, even if, for example, the regulating valve 1 is used for high pressure control and vibrations are relatively large, sufficient locking effects can be expected.

In addition, if a knurled pin is used as the locking member 15, the locking member 15 can be prevented from being disconnected due to vibrations or the like during use of the regulating valve 1.

Although the inventions implemented by the inventors and the like has been described above specifically based on the embodiment, the disclosure is not limited to the embodiment and it will be appreciated that various modifications can be made without departing from the scope of the disclosure.

For example, although the holes 122 formed in the valve stem 12 are through-holes in the above embodiment, the holes 122 may be blind holes when, for example, the regulating valve 1 is used for low pressure control and vibrations of the valve stem 12 and the valve body 11 are small.

In addition, although the grooves 114 are formed in the cylindrical portion 111 of the valve body 11 in the above embodiment, elliptic through-holes may be formed in place of the grooves 114.

In addition, although the number of the grooves 114 of the valve body 11 is larger than the number of the holes 122 of the valve stem 12 in the above embodiment, the disclosure is not limited to the embodiment. For example, the number of the holes 122 may be the same as the number of the grooves 114 or the number of the holes 122 may be larger than the number of the grooves 114.

In addition, although the male screw 120 is formed in the end portion of the valve stem 12 close to the valve body 11 in the above embodiment, the male screw 120 may be exchanged with the region 121 in which no threads are formed. In this case, the female screw 112 may be exchanged with the region 113 in which no threads are formed and a plurality of grooves 114 may be elliptic through-holes also in the valve body 11. In this configuration, the same effects as the regulating valve 1 according to the above embodiment can be obtained.

In addition, although the locking member 15 is a knurled pin in the above embodiment, the locking member 15 is not limited to a knurled pin as long as the locking member 15 is a pin having a shape capable of preventing the engagement between the male screw 120 of the valve stem 12 and the female screw 112 of the valve body 11 from being loosened.

In addition, although the regulating valve 1 has the valve body 11 of, for example, a contoured shape in the above embodiment, the shape of the plug head 110 is not limited to the embodiment. For example, the plug head 110 may be cage-shaped, triangular, or multistage depressurization-shaped.

In addition, although a bellows 123 is welded to the valve stem 12 in the regulating valve 1 according to the above embodiment, the disclosure is not limited to the embodiment and the bellows 123 does not need to be formed.

DESCRIPTION OF REFERENCE NUMERALS AND SIGNS

1: regulating valve, 10: valve box, 11: valve body, 121 valve stem, 13; gland portion, 14: setting/operating device, 15: locking member, 110: plug head, 111: cylindrical portion, 112: female screw, 113, 121: non-threaded region, 114: groove, 120: male screw, 122, 122_1, 122_2: hole, 123: bellows, W: width in circumferential direction of groove 144, D1: depth of groove 144, D2; distance between holes 122, r: diameter of hole 122, P: axial line

The invention claimed is:

1. A regulating valve, comprising:
a valve body having one end at which a plug head is provided and the other end at which a cylindrical portion is provided, the plug head controlling a flow rate of a fluid in a valve box;
a valve stem having one end connected to a setting/operating device and the other end inserted into the cylindrical portion of the valve body and coupled to the valve body; and
a locking member for preventing a coupling between the valve body and the valve stem from being loosened,
wherein the valve body includes a female screw including threads formed on an inner wall of the cylindrical portion and a plurality of first holes penetrating entirely through the inner wall and an outer wall of a body region of the cylindrical portion, the body region having no threads of the female screw, wherein the plurality of first holes includes a plurality of grooves formed in an end portion of the cylindrical portion so as to extend in an axial line direction of the cylindrical portion, and a depth of the grooves is larger than a width in a circumferential direction of the grooves,
the valve stem includes a male screw having threads formed on a surface close to the other end of the valve stem and at least one second hole formed in a stem region of the surface close to the other end of the valve stem, the stem region having no threads of the male screw,
the valve body is coupled to the valve stem when the female screw is engaged with the male screw, and
the locking member is inserted into the at least one second hole of the valve stem through any one of the first holes of the valve body.

2. The regulating valve according to claim 1,
wherein the at least one second hole is formed so as to penetrate through the valve stem,
the plurality of grooves of the valve body is disposed point-symmetrically with respect to the center of the cylindrical portion of the valve body in plan view, and the locking member is inserted into a set of the grooves disposed point-symmetrically and into the at least one second hole.

3. The regulating valve according to claim 1, wherein the at least one second hole includes a plurality of second holes.

4. The regulating valve according to claim 3,
wherein the other end of the valve stem is formed in a cylindrical shape, and
two second holes of the plurality of second holes are disposed so as to deviate from each other in a shaft direction of the valve stem, the two second holes being adjacent to each other in a circumferential direction of the valve stem.

5. The regulating valve according to claim 1, wherein the locking member is a knurled pin.

6. A valve body for a regulating valve, the valve body having one end at which a plug head is provided and the other end at which a cylindrical portion is provided, the plug head controlling a flow rate of a fluid in a valve box, the valve body comprising:
a female screw formed on an inner wall of the cylindrical portion, the female screw being formed to be engaged with a male screw formed on a surface of a valve stem; and
a plurality of holes into which locking members are inserted to lock a looseness between the male screw and the female screw, the plurality of holes penetrating entirely through an inner wall and an outer wall of a region in the cylindrical portion, the region having no threads of the female screw, wherein the plurality of holes includes a plurality of grooves formed in an end portion of the cylindrical portion so as to extend in an axial line direction of the cylindrical portion, and a depth of the grooves is larger than a width in a circumferential direction of the grooves.

7. The valve body according to claim 6,
wherein the plurality of grooves is disposed point-symmetrically with respect to a center of the cylindrical portion in plan view.

* * * * *